Patented Jan. 22, 1952

2,583,098

UNITED STATES PATENT OFFICE 2,583,098

TREATMENT OF WASTE PICKLE LIQUOR

George W. Heise, Rocky River, Erwin A. Schumacher, Parma, and Howard R. Wilson, Painesville, Ohio, assignors, by mesne assignments, to Union Carbide and Carbon Corporation, a corporation of New York Application March 25, 1947, Serial No. 737,000

18 Claims. (Cl. 204—112)

This invention relates to the treatment of waste pickle liquor to dispose of the liquor and to recover the metal and a salt of the pickling acid as high grade salable materials and to accomplish this in an economical manner.

Although much effort has been devoted to the problem of disposing of waste pickle liquor, as indicated by the many proposals for its disposition discussed in the article entitled "Waste Problems of the Iron and Steel Industries," by Willard W. Hodge, appearing at pages 1364-80 of Industrial and Engineering Chemistry, vol. 31 (No. 11, November, 1939), the problem has not heretofore reached adequate solution and is still of great industrial and sanitary importance.

Applicants Heise and Schumacher, in their Patent No. 2,273,036, have disclosed the possibility of electrolyzing solutions containing ferrous sulphate to oxidize the ferrous to ferric sulphate, and of removing the product through a porous carbon anode. In their Patent No. 2,389,691, applicants Heise and Schumacher have applied electrolysis to high acid pickle liquor using a Castner cell or similar apparatus but this necessitates the use of mercury and a secondary electrolysis if the recovery of electrodeposited iron is desired.

The general object of the present invention is an economically sound process which utilizes waste pickle liquor and other very cheap materials such as are readily available at a steel plant, operates upon them at a very low cost from the standpoint of apparatus, labor and electric power, and yields final products of relatively high value; yet it produces no noxious waste. Specific features wil be found in the following more detailed description dealing with sulphate pickle liquor as an example since sulphuric acid is the acid most generally used for pickling.

In general, the present process involves preparing the pickle liquor for electrolysis; electrolyzing the prepared liquor at a high current efficiency in a cell at a low power cost, cathodically depositing a very pure brittle iron, easily comminuted and highly desirable for powder metallurgy and, by the electrolysis, preparing at the anode a uniform solution of ferric and ferrous salt of a desired composition; from the solution of the iron salts recovering iron oxide or hydrate and ammonium sulphate, both of which are of high quality and of industrial value; leaving only water as the final waste; and preferably operating the process in a continuous manner which involves the correlation of treatments so that the products of one treatment are in a condition for further treatment until the final products are obtained. The electrolysis will be described in connection with the cell (which is the subject of the patent application of J. P. Oliver, Serial No. 736,939, filed March 25, 1947) shown on the accompanying drawing, wherein:

Figure 1:
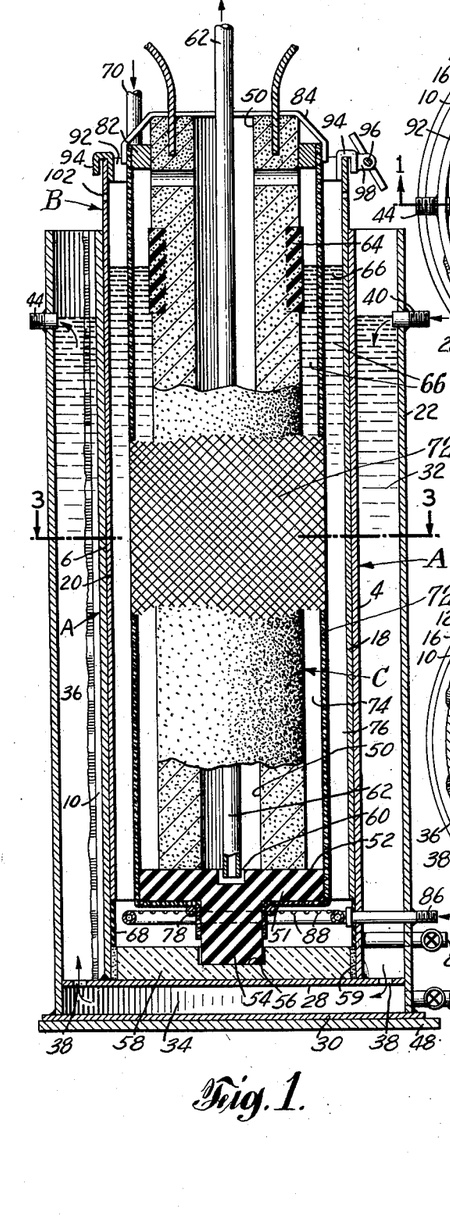
Fig. 1 is a longitudinal section through the cell taken on line 1—1 of Fig. 2.
Figure 2:
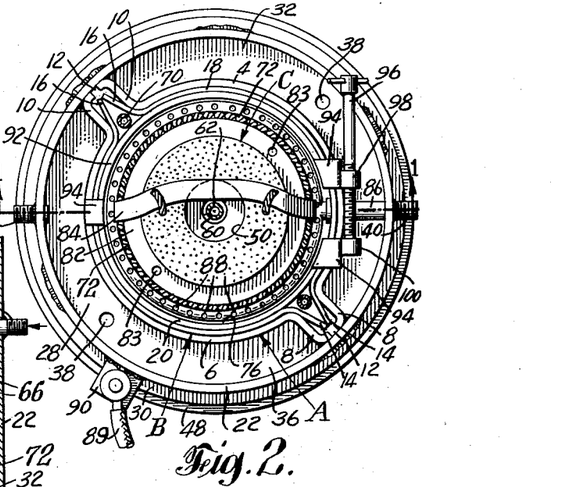
Fig. 2 is a plan view of the cell.
Figure 3:
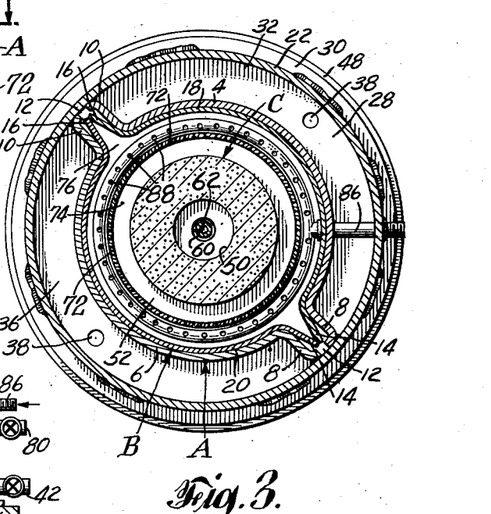
Fig. 3 is a section on line 3—3 of Fig. 1.

In general, the cell comprises a conducting container A, a removable cathode B upon which iron is deposited and a porous anode C. Treated pickle liquor is continuously run into the cell between the electrodes and an effluent is withdrawn from within the anode. A portion of the iron in the liquor is plated out on the cathode; and during the passage of the liquor through the anode a portion of the remaining iron is oxidized to the ferric condition so that a black granular iron hydrate may easily be precipitated from the effluent.

The container A is preferably of metal and is shown as comprising two parts 4 and 6 which hold the electrolyte. Each container part has longitudinal flange portions 8 and 10 which are spaced to provide longitudinal recesses 12 to receive longitudinal flanges 14 and 16 of the parts 18 and 20 of the primary plating surface or removable cathode B. The flanges 14 and 16 join the parts 18 and 20 in a smooth curve to minimize treeing of the deposited iron. For convenience, the parts 4 and 6 are separate and the outer edges of the flanges 8 and 10 are welded or otherwise joined together or to a shell 22 with a fluid-tight juncture. The flanges 14 and 16 are so wide that either part 18 or 20 will remain in place without the other.

The bottom 28 of the container is welded or otherwise joined to the parts previously mentioned with fluid-tight junctures to complete the vessel holding the electrolyte and to maintain the parts in assembled relation. A base plate 30 which is welded or otherwise joined to the bottom of shell 22 with a fluid-tight juncture serves as the base for the assembly and, with the associated parts of the device, forms the spaces 32, 34 and 36 for temperature regulating media, for instance hot or cold fluids, usually water, which are free to pass between the spaces by means of the openings 38 and may be introduced or withdrawn through the pipes 40, 42 and 44. The edge of the plate 30 should extend a suitable distance beyond the periphery of the cell assembly to allow for such corrosion as may be occasioned by stray currents but any suitable anticorrosion installation may be used in connection with the cell. Preferably the cell rests upon a separate plate 48 which takes such corrosion as may be occasioned by stray currents.

The anode C is of the porous carbon type and is preferably circular with the central well 50. The bottom of the anode is a block 51 of insulating material cemented or otherwise fastened to the upper conducting tubular portion and preferably has the construction shown, presenting a circular flange 52 and means for centering the anode in the cell, for instance a centering projection 54 which fits into a cooperating well 56 in a centering base 58. The base 58 is of any material, preferably insulating, which does not affect the electrolyte, for instance cement or molded plastic and may be held in place in any suitable manner, as by an adhesive 59 or by a tight fit against the container walls, or both. The bottom of the anode well 50 is preferably provided with a smaller auxiliary well or depression 60 to receive and center the bottom of a tube 62 through which the effluent is withdrawn from the cell by any suitable means (not shown), for instance a pump or siphon. It has been found that this construction gives a uniform flow of electrolyte through the anode.

A porous graphite anode of No. 40 grade (the grade designation here used being that described in the Werking article, subsequently referred to herein) with relatively thick walls is very suitable for use in the present cell for the treatment of ferrous sulphate solutions. The preferred wall thickness depends on operating conditions, particularly current density and rate of flow of solution through the porous anode, increasing thickness not only lowering the electrical resistance of the anode but, in addition, tending to minimize structural irregularities which might influence uniformity of flow throughout the electrode itself. By way of example, a No. 40 grade cylindrical anode with an outer diameter of 6⅝ inches at the conducting portion, a conducting length of 28 inches and a wall thickness of 2 inches will handle a current of 200 amperes and a flow of 170 cc. per minute of an electrolyte containing about 80 grams per liter of ferrous iron, to yield an effluent in which the iron is about two-thirds ferric iron and one-third ferrous iron. The size of pore should be correlated with the flow of electrolyte through the porous electrode, for any given current, to prevent destructive attack on the anode. The pores should be small enough and the flow of electrolyte should be fast enough to sweep ferric iron through the anode as fast as it is formed and to present to the surface of the anode sufficient fresh electrolyte containing ferrous iron to permit anodic depolarization and thus to prevent the generation of oxygen at the anode. When a fluid moves past and in contact with a solid, the solid exerts a drag or so-called "skin-effect" whereby the layer of the liquid which is next to the solid moves more or less slowly. If this layer of electrolyte which is in contact with the anode surface moves too slowly all of its iron will be oxidized to ferric iron, and oxygen which will attack the anode will be generated at the anode surface. The number of pores should be sufficiently great to pass the required volume of liquor but each pore should be sufficiently small that the electrolyte passes through it at such a rate as to sweep ferric iron away from the anode surface and present ferrous iron for oxidation in such an amount that no gas is generated.

Thus, the grade of porous carbon or graphite must be such that adequate depolarization and flow rate are accomplished simultaneously. Excessive fineness makes it difficult to maintain satisfactory flow of electrolyte through the porous electrode and increases the danger of plugging by suspended matter, hydrolysis products, and the like. With too coarse a porous electrode, on the other hand, the surface velocity may be reduced to a point where depolarization does not take place efficiently, the anode voltage, as determined by single electrode potential measurements, rising from the desired $Fe^{II} : Fe^{III}$ equilibrium voltage toward the discharge potential of oxygen. A further result of excessive pore diameter and insufficient surface velocity is back diffusion of ferric salt, re-solution of electro-deposited iron, and lowering of current efficiency.

The anode is preferably provided with a surface insulation 64 of any suitable type at and adjacent to the surface of the electrolyte 66. This is important when porous carbon anodes are used in processes such as an anodic oxidation of ferrous sulphate. In electrolysis, there is a pronounced tendency for a higher current to pass through the electrodes near the leads, and near the surface of the electrolyte, rather than well below the surface of the electrolyte and away from the leads. In the treatment of ferrous sulphate using the porous carbon anodes, if the current anywhere on the anode is more than sufficient to oxidize to ferric iron all of the ferrous iron which enters the anode at any particular area, there is a tendency toward oxygen formation and destructive attack of the electrode, the latter characterized by softening and disintegration of the carbon or graphite, and great reduction in its useful life. Also, oxygen or other gas within the anode blocks the passage of electrolyte through the porous electrode; the affected portions no longer function as depolarizing porous electrodes; the remaining portions are overloaded; and current efficiency and anode life are reduced. The insulation 64 thus prevents the excessive flow of current which would occur (save for the insulation) at the surface of the electrolyte and prevents a high current density at that portion of the anode which is immediately adjacent the surface of the electrolyte. A further objective of the insulation 64 is to facilitate matching of anode and cathode areas, thus preventing excessive local current densities at the latter and so eliminating the edge effects, nodulization and treeing of electro-deposited metal associated with uneven current distribution. For this reason the cathode preferably exends slightly beyond the active anode surface, so that a comparatively thin metal deposit, rather than a heavy, nodulized or tree-forming plate is produced near the cathode edges. For the cell as described, an active cathode area extending about two inches beyond (above and below) the active anode area, with an electrolyte level about two inches above the top of the active anode surface, has been found satisfactory. This correlation, while it prevents the development of anodic gas and consequent corrosion and gas plugging or blocking of the anode, yields a cathodic deposit which shows a tapering toward the edges, without treeing or nodulization.

The insulation is preferably in the form of a band of a material which is non-absorptive of the electrolyte, applied to the surface of the electrode and wide enough to extend a sufficient distance above the electrolyte level to prevent creepage of the electrolyte up the anode and a leakage current over the surface of the insulation. An excellent insulation is provided by a fluid insulation material applied to and soaked into the porous anode a sufficient distance (about ⅛ inch or more) to afford a grip; and then hardened to give a non-conducting surface band. This may be accomplished by applying to the anode a melted insulating wax or other material or by applying a solution of an insulating material in a volatile solvent or a varnish which will harden in situ to form the insulation after being applied to the anode, or by other convenient means. With an anode of the dimensions previously given carrying 200 amperes as stated and with the anode and the cathode 1⅞ inches apart, insulation extending 2 inches below the surface of the electrolyte is satisfactory. The depth of the insulation may be less with wider electrode spacing or less current, or both.

In addition, the upper portion of the electrode, e. g. to the lower edge of the insulating band, preferably is waterproofed to prevent the acidic electrolyte from drawing up through the anode and corroding the electrical connections. Such waterproofing may be accomplished prior to the application of the insulating band, by dipping in molten paraffin or by soaking in a solution of wax, or equivalent, in a volatile solvent. Conductivity from the electrical connections to the main body of the anode is through the contacting conducting particles from which the anode is made, hence is not affected by the waterproofing treatment.

In connection with the matter of current density, the relative positions of the bottoms of the electrodes is of importance as is the insulation of the cross section of the anode at its bottom. The conducting portion of the anode ends above the bottom of the removable cathode primary plating surfaces and the flow of current from the cross section of the bottom of the conducting portion of the anode is prevented by the insulating block 51. The difference in level between the bottom of the conducting portion of the anode and the bottom of the removable cathode is about 2 inches with the electrodes spaced as herein described and using the current stated. This prevents treeing of the deposit at the bottom of the removable primary cathode sections 18 and 20 and reduces deposition of metal on any exposed portion of the auxiliary or secondary cathode. Completely to prevent such deposition, the exposed lower portion of the auxiliary cathode may be protected with a suitable non-conducting coating 68 which is preferably sufficiently thick and rigid to provide a seat and stop for the bottom of the removable cathode. Any suitable material, for instance cement or plastic, may be used.

It is well established that, in the electrolysis in question, and back diffusion of anodically oxidized ferric salt to the cathode will reverse the electrodeposition reaction and, by redissolving electrolytic iron, as indicated by reading the foregoing equation from right to left, reduce the electrochemical efficiency of the process. To a large extent the porous anode serves to prevent such reversal, the oxidized electrolyte being drawn through the porous carbon at relatively high speed, thus minimizing back diffusion toward the cathode. Further, to prevent access of ferric ions to the cathode and to insure a maximum concentration of ferrous ions at that point, the electrolyte is preferably introduced through one or more pipes 70 which deliver the liquid between the cathode and a foraminous screen 72 located between the electrodes. The screen 72 acts as a barrier and additional safeguard against back diffusion of ferric ions. In contradistinction to ordinary forms of diaphragm, which because of their relatively low permeability, introduce considerable electrical resistance into the cell, the screen in question is very permeable, offering no substantial resistance either to flow of electrolyte or of current. It makes a rough separation of the cell into anode compartment 74 and cathode compartment 76 and, by forming a barrier at which there is an appreciable velocity of electrolyte flow from cathode to anode compartment, it reduces the opportunity for ferric ions to diffuse toward the cathode. The screen also keeps from the anode compartment such solid particles as may be in the cathode compartment and may plug the pores of the anode. The screen may be of any of the usual materials which are suitable for use with the electrolyte in the cell, for instance asbestos or glass fabric, where the electrolyte is acidic ferrous sulphate solution.

The screen may be fastened in place in any suitable manner. In the present construction disclosed herein, the lower portion of a tubular screen of glass fabric is brought outside of the flange 52 of the anode and then fastened onto the bottom of the anode as by a cord 78. At the bottom of the cell, the screen is spaced from both of the electrodes in any suitable manner but preferbly the diameter of the flange 52 is such as properly to effect this spacing. The flange and adjacent bottom portions of the anode are also preferably so spaced from the block 58 that any solid particles in the cathode chamber can settle into this space to facilitate their removal when the cell is cleaned. A pipe 80 permits the cell to be emptied and the cell and screen cleaned and washed without removing the anode assembly and also permits any sediment to be drained while the cell is in operation. The screen and anode are preferably a unitary assembly in order that they may be assembled outside of the cell and inserted into the cell as a unit.

The screen is preferably under tension to keep it spaced from the anode. In the cell shown, the top of the screen is fastened to a circular spacing ring 82 of any suitable material, preferably insulating, for instance wood or hardened plastic, and provided with a hole or holes 83 through which additions to the cell solution, e. g. the acid used in starting the cell, can be made directly into the anode compartment. The top assembly is supported from the top of the anode by a strap 84 or other supporting means, preferably removable and tensioning, for instance elastic rubber or other suitable material, which keeps the screen tensioned and in place and prevents sagging of the screen. The screen should not touch the cathode else an even deposit may not be obtained or the deposit may grow into the screen with consequent tearing of the screen when the cathode is removed; further, such deposition shortens the electrolytic path and causes lower resistance, favoring continued growth of deposit, frequently in the form of treeing which, in extreme cases, may actually reach to the anode and so short-circuit the cell. The spacing ring 82 is preferably slidable along the anode so that it can move to keep the screen tight. A suitable screen is glass cloth about 1/16 inch thick spaced about 1/2 to 3/4 inch from the anode giving a smaller anode chamber than cathode chamber, which chambers together form the electrolyte chamber with the electrolyte freely movable from the cathode chamber to the anode chamber. The larger cathode chamber allows a relatively thick layer of metal to be built up before the cathode has to be changed and renders the screen less liable to injury. A screen of sufficient rigidity to be self-supporting may be used, if desired.

To ensure smooth deposits of reasonable thickness, the electrolyte in the cathode chamber may be kept in motion to sweep from the cathode any gas bubbles which may form at or tend to adhere to the deposit. In the present cell, the continuous introduction of electrolyte into the cathode compartment will do this to a large extent. However, auxiliary stirring by any suitable means may be used. In the cell shown, such stirring may be effected by a gas introduced into the cathode chamber through the pipe 86 and the connecting perforated tube having numerous small openings 88 to permit the escape of the gas. The tube is preferably of insulating material, for instance plastic, and is located outside of the screen 72 and below the bottom of the primary plating surface B but above the bottom of the electrolyte chamber. This construction effects such slight evenly distributed auxiliary movement of the electrolyte as may be desirable in addition to that effected by the introduction of the pickle liquor into the relatively small cathode chamber but provides a volume of relatively quiescent liquor below the stirring tube 86 in which sediment may collect and be withdrawn from time to time through the pipe 89 while the cell is in operation. The gas which is used for stirring may be air or may be inert or non-oxidizing. Only a small amount of gas need be used because of the electrolyte movement obtained by the continuous flow of electrolyte through the cell. Inert gas, for instance nitrogen, is costly and air has a tendency to oxidize the ferrous iron in the pickle liquor to the ferric state and thus decrease the deposit of iron per unit of electricity. In either instance benefits are derived from the ability to use a minimum amount of gas for auxiliary electrolyte movement while effecting a large portion of such movement by means of the flow of liquor through the cell. The liquor in the anode chamber is preferably not stirred and is relatively quiescent.

In assembling the cell, the outer unit comprising the container A, the parts integral therewith, the pipe 86 and the base 58 are first assembled. The parts 18 and 20 of the primary plating surface B are then slid into the container A to the proper depth. The parts 18 and 20 may be of any metal capable of receiving the deposit, for instance copper or aluminum, but are preferably of slightly springy metal, preferably iron, mild steel, or stainless or other corrosion-resistant alloy steels or Monel metal so that the spring of the metal causes the parts to bind against the container A thus holding the parts 18 and 20 in place by friction and providing electrical contact with the container A to which current is conducted through a conductor 89 connected in any suitable manner to the outer unit, or by a lug 90 on the shell 22. The parts 18 and 20 are preferably of about 22 gauge metal for mild steel, or thinner for the more rigid metals, so that they are sufficiently strong to support themselves and are not easily bent but yet are sufficiently flexible that they can be flexed with the hands to loosen the deposited metal. The flanges 14 and 16 of the parts 18 and 20 slide down the recesses 12 to guide the parts 18 and 20 in their travel, and the flanges 14 and 16 are preferably so formed that each flange meets its cooperating flange in the recess. This meeting of the flanges closes the recesses 12 to prevent plating of the metal in the recesses and, because of the springy character of the parts 18 and 20 and the flanges, forces the parts 18 and 20 firmly in contact with the container A. The flanges 14 and 16 preferably meet in a line beyond the normal "throwing" power of the metal so that the parts 18 and 20 are not united by the deposit and can separately be inserted or withdrawn from the cell after receiving a deposit. For particularly heavy deposits, danger of bridging may be avoided by painting the flange portions 14 and 16 with an insulating material, for instance asphalt or other paints.

Suitable means may be used to ensure that the plating surfaces 18 and 20 remain in place and have sufficient electrical contact with the outer unit of the cell. A preferred device for effecting this is an expandable ring 92 which may be supported in place in any suitable manner, as by the integral hooks 94, and which may be expanded or contracted by the threaded rod 96, working in the threaded ear 98 and bearing 100. While the parts 18 and 20 may be held in place in any suitable manner, the friction fitting described is preferred as it is simple, enables the primary plating surfaces to be clamped in place after adjustment to the proper depth, allows one part of the primary plating surface to be removed without the other and obviates the necessity of disconnecting and connecting leads when the plating surfaces are changed. Any suitable means, for instance holes 102 (or lugs) at the tops of the parts 18 and 20 enable the parts to be gripped for removal from the cell.

As will later be explained in greater detail: the pickle liquor is prepared for electrolysis by treating it to "kill" the pickling inhibitor and to correlate both the pH value and the ammonium sulphate content so that a smooth thick plate of iron can be obtained at high current efficiency and so that the anode does not become plugged; thus the cell needs only infrequent attention. The cathode is preferably conditioned prior to use so that the plate of iron adheres well but can easily be removed therefrom when the cathode is withdrawn from the cell; and the anode is preferably conditioned prior to use to ensure its proper operation when the cell starts, and its efficient operation and long life thereafter. The cell is started under such conditions that a good strike of iron is obtained on the cathode without deteriorating the anode; and the factors involved in the operation of the cell (the composition of the electrolyte, the flows of the electrolyte and current, and the temperature) are correlated to prolong anode life, to enable the cell to operate at a low voltage and preferably to yield a cell effluent carrying ferrous and ferric iron salts in the proportion of two-thirds ferric ions and one-third ferrous ions. From the effluent is directly precipitated a granular easily filterable hydrated black iron oxide of maximum purity, and high quality ammonium sulphate is recovered from the filtrate by mere evaporation.

of water. The various treatments will be discussed in the order of their occurrence.

Sulphate pickle liquor, as it leaves the pickling plant, cannot simply be electrolyzed for the recovery of the values which it contains; its characteristics are such that the cathode efficiency of the cell is poor; and its constituents are such that although iron may be deposited at the cathode, such plate as is formed is rough, and trees quickly form which tend to short circuit the cell unless the electrodes are quite a distance apart; and spacing the electrodes sufficiently far apart to prevent short circuiting requires a relatively long current path through the electrolyte which increases the power consumption.

Though commercial waste pickle liquor contains a large quantity of iron sulphate, almost entirely in the ferrous state, and free acid, it also contains residual inhibitor from the pickling operation. We have found that to obtain a good plate, the inhibitor must be removed or inactivated when the pickle liquor is to be the electrolyte in that type of cell wherein the pickle liquor contacts both the anode and the cathode on which a plate is to be obtained. Inhibitors can be removed with greater or less effectiveness by various methods. For example, they may be removed by adsorption, e. g. upon activated carbon. In this case the raw liquor is preferably first filtered to remove sludge, which might cause the carbon to lose its adsorptive characteristics rather quickly, and the filtered liquor is then treated with the activated carbon in any suitable manner, for instance by mixing with the carbon and filtering out the carbon or by filtering through the carbon. An exceedingly simple but effective method of rendering inhibitors inactive is treatment of the raw pickle liquor with nitrous acid or a nitrite as more fully explained in the copending application of J. P. Oliver, Serial No. 737,093, filed March 25, 1947. In the nitrite treatment, we add nitrite in the proportion of about 1 gram of sodium nitrite per gallon (0.264 gram per liter) of raw pickle liquor which amount is generally sufficient to "kill" all of the inhibitor in the usual pickle liquors. When the nitrite is added nitrogen is evolved and the liquor becomes brown but resumes its natural bluish green color, characteristic of ferrous sulphate, upon standing for several hours exposed to the air or, more quickly, if blown with air. A test for the sufficiency of the nitrite addition is to observe the evolution of hydrogen on a strip of iron placed in the liquor; before the nitrite addition very little hydrogen will form on the iron and after the addition of the nitrite, hydrogen will be evolved more copiously from the iron. Sufficient nitrite should be added so that further additions of nitrite do not increase the rate at which hydrogen is yielded on the iron. Pickle liquor which has been treated with activated carbon may also be tested with the iron strip, the liquor being treated until further treatments do not increase the rate of hydrogen yield at the iron strip. Whether these or other methods of inactivating inhibitor are used, it is essential to our process that the inhibitor be killed to obtain optimum results. It is not at all obvious that the inhibitor should be killed because in many plating processes the baths are "doped" with various additives on the theory that the plating is thereby improved. Iron is a difficult metal to plate satisfactorily and it is surprising to find that an additive (the pickling inhibitor) which assists in evening the action of the acid in the pickling of iron (essentially an electrochemical action) is harmful in another electrochemical action, the plating of iron. Presumably the type of surface adsorption characteristic of inhibitor action produces an unsatisfactory base for cathodic deposition.

Liquor containing from 50 grams of ferrous iron to saturation of the liquor may be used in our process, the operation of the electrolytic cell being correlated to these amounts of iron later in the process. A saturated sulphate liquor contains about 100 grams of iron per liter at room temperature, the exact amount depending on temperature and acid concentration, increasing with rising temperature and decreasing with higher acid concentration. For satisfactory cell operation and subsequent handling of effluent liquor, an initial concentration of about 80 grams of ferrous iron per liter is preferred in our process. The amount of iron sulphate in the liquor as prepared for electrolysis must be correlated with the amount of other sulphates and sulphuric acid in the liquor and with the operating temperature of the cell to the end that sulphates do not precipitate from the electrolyte in the cell, to foul the cathode or to plug the anode or supply lines.

The iron content of the pickle liquor is preferably corrected so that the liquor contains from 75 to 85 grams of ferrous iron per liter, the optimum being about 80 grams, substantially all of the iron being in the ferrous state. The correction of the ferrous sulphate may be made in any suitable manner. Liquors which are too concentrated may be diluted. A too dilute liquor may be fortified by the addition of ferrous sulphate or by treatment with scrap iron which reacts with the free acid. If scrap iron is used, the treatment is preferably effected after the inhibitor is killed, to facilitate the action of the acid on the iron.

The free acid content of the pickle liquor is also preferably corrected and correlated with the other operating factors of the process as a whole. Calculated as $H_2SO_4$, the free acid may vary between 6 and 14 grams per liter of liquor but the quantity of acid is preferably corrected to from 7 to 9 grams per liter for normal operation of the cell with the optimum at 8 grams per liter for pickle liquor otherwise treated in the preferred manner as herein described. Where the electrolyte of the plating cell is pickle liquor treated as herein described, the cathodic efficiency decreases as the free acid content of the liquor increases; but it has been found that in a cell where the sulphate liquor contacts both electrodes and is at a temperature under 40° C., if the free acid is under 6 grams of acid per liter of liquor, hydrolysis of iron salts occurs, the anode plugs, and the cell operation is impaired, whereas with increase in free acid content substantially above 14 grams per liter, cathode efficiency becomes undesirably low. The pH of the treated liquor fed to the cell may vary between 1.2 and 2 but is preferably substantially over 1 with a preferred minimum of 1.25 and the optimum between 1.3 and 1.6 as measured at room temperature. The desired free acid content may be obtained by adding either an acid or a base to the liquor. In accordance with our process the preferred base is ammonia, this being a by-product of the coke ovens, low in cost and a component of a final product of the process, namely ammonium sulphate; conversely, if an acid is added it is preferably the same acid as in the pickle liquor so that the ammonium salt finally recovered will not be a mixed salt.

In accordance with the preferred process, the amount of salts of bases other than iron in the liquor is corrected and correlated to the other ionizable materials present. The preferred salt is ammonium sulphate. The amount of such salt may range from 10 grams per liter to 60 grams or more with a preferred concentration at about 30 grams per liter, as would be formed from a pickle liquor originally containing 30 grams of free acid per liter, neutralized with ammonia to leave a residuum of 8 grams of acid per liter. The total amount of salt in the electrolyte, however, must be such that when the cell is in normal operation, the salts do not precipitate out and plug the anode. The electrolysis may be run without the correction of the non-ferrous salt content but it has been found that the electrolysis runs more evenly and a smoother deposit of iron is obtained in the case of pickle liquor which contains "killed" nitrogenous inhibitor, if a suitable non-iron salt content is present. Since the solution electrolyzed is of relatively low conductivity, the electrodes are preferably spaced quite closely (about 1⅞" apart) to minimize power loss in the electrolyte. Ammonium sulphate aids in the realization of these objectives by increasing electrolyte conductivity and by helping to prevent both ridging and treeing. A preferred correlation of ionizable materials in the electrolyte is 80 grams of ferrous iron, 8 grams of free sulphuric acid and 30 grams of ammonium sulphate per liter of pickle liquor, giving a pH of 1.35–1.45. If insufficient ammonium sulphate is formed by neutralization, the salt may be added as such, since it is a final product of the process and is available at substantially no cost. The correction of the ammonium salt content is preferably the last rectification made in those materials containing the sulphate ion, and the amount of salt which can be added is correlated with the materials of previously regulated concentration and with the temperature at which the cell is to be operated, to the end that the liquor carry at least as much of the iron salt as corresponds to 50 grams of iron per liter and such amount of ammonium sulphate up to approximately 30 grams to 60 grams as does not cause a precipitate at the temperature of the operating cell. It should be understood that the order of making the corrections is important when a new raw liquor is to be treated. After the composition of the raw liquor has been determined and the proper amounts of benefactive materials have been ascertained, subsequent portions of liquor of the same analysis may have the benefactive materials added in any order if acid correlation is made by neutralization with ammonia. Inhibitor preferably should be killed before treatment, if excess acid is to be reduced by treatment with scrap iron. Instead of the ammonium sulphate, salts of other acids and bases or the bases themselves may be used; however, one of the final products of the present process is ammonium sulphate and the addition of any salt other than ammonium sulphate contaminates the final product.

After the liquor is treated as previously described, insoluble materials are removed from the liquor in any suitable manner, for instance by allowing the insolubles to settle (or float) and decanting the clear liquor, or by filtering, or both. The liquor may be clarified at any time after such treatments as form insolubles; for instance if barium nitrite is used to kill the inhibitor and forms insoluble barium sulphate, clarification of the liquor is preferably delayed until after the nitrite treatment. As a result of the preferred treatment of the sulphuric acid waste pickle liquor received from the pickling vats, there remains a clear liquor ready for electrolysis containing, per liter, about 80 grams of iron as ferrous sulphate, 8 grams of free sulphuric acid, and 30 grams of ammonium sulphate together with negligible amounts of ferric iron, tramp metals or the metal from the nitrite and the quantity of soluble organic materials resulting from "killing" the inhibitor originally in the pickle liquor. Whatever variations are made in the quantities of dissolved substances, no precipitate, crystals or other solid should appear in the liquor upon cooling the liquor to between 25 and 35° C. or the temperature at which the cell operates; and a feature of the invention is that the cell can be operated at a temperature at or below 40° C. with high efficiency, no crystallization from solution nor precipitation of insoluble hydrolysis products and with such a good adherent smooth plate of iron that a cell with a short current path can be used.

After conditioning, the treated liquor is subjected to electrolysis by being passed continuously into a cell in which a portion of the dissolved iron is deposited on the cathode and the remainder is continuously subjected to the proper electrolytic oxidation to the ferric condition to yield a continuous flow of cell effluent containing the desired proportion of ferrous and ferric iron in solution. To accomplish this requires a correlation of the current flow with the flow of liquor and with the iron content of the liquor. It is preferred that the cell effluent contain ferrous iron and ferric iron in the proportion of one part by weight of ferrous iron to two parts by weight of ferric iron so that, upon mixing the effluent with a base, for instance ammonia, a hydrated black ferrosoferric oxide may be precipitated.

If desired, however, the current flow and the liquor flow may be correlated to give a higher proportion of ferric iron or a higher proportion of ferrous iron. The cell effluent may contain most of its iron as ferric iron but, with porous carbon anodes, the current flow and electrolyte flow should never be so correlated that gas is generated anywhere on the anode. If the current flow is too high for the electrolyte flow, oxygen will be generated at the anode. This may appear as oxygen bubbles with the possible inclusion of some carbonaceous oxides, the oxygen having reacted with the carbon of the anode to form the carbonaceous gas and corrode the anode. No gas should be allowed to generate on the anode and in particular no oxygenic nor carbonaceous gas but the current flow may be increased relative to the liquor flow up to this point. At the anode, oxidation of the iron proceeds at 100% current efficiency and with complete recovery of the anodically oxidized ferric iron in the cell effluent. Continuous, trouble-free operation is ensured by maintaining a flow of solution through the anode sufficient to provide Fe" in an amount at least 5% to 10% in excess of that demanded by current usage. To obtain the desired 2:1 ratio of ferric to ferrous iron in the cell effluent, the solution flow is correlated with current flow and ferrous iron content of the liquor to provide 50% more Fe" than the theoretical current demand for complete oxidation. In this way the anode potential is determined by the $Fe''/Fe'''$ equilibrium voltage instead of by the oxygen discharge potential and can be maintained at about 0.3 volt or more below the theoretical value of the latter, thus substantially reducing the power requirement of the cell and protecting the anode from oxidative attack and associated disintegration. The higher the current flow, relative to the liquor flow, the greater is the proportion of the iron originally in the pickle liquor which is deposited as a plate of dendritic iron, this type of iron being preferred. A feature of the invention is that a pure brittle easily powderable iron can be obtained as a plate at cathode current densities well below 75 amperes per square foot and with no formation of powdered iron and without the use of addition agents (other than ammonium sulphate) in the cell.

In order to decrease the amount of liquor flowing through the cell and thus decrease the possibility of solid matter entering the cell and plugging the anode but yet provide a liquor which contains the correct proportion of ferrous to ferric iron to precipitate the ferrosoferric oxide upon mixing with ammonia, it may be desirable that the cell be operated to yield an effluent containing as great an amount of ferric iron as possible. The effluent will then be mixed with the proper proportion of non-electrolyzed pickle liquor, which contains substantially all of its iron as ferrous iron, to provide a liquor containing about two-thirds ferric iron and one-third ferrous iron which is the feed for the ammoniacal precipitation bath. The non-electrolyzed pickle liquor need not have the inhibitor killed and may be purified or not depending upon the purity required in the final products of the process. Preferably, the non-electrolyzed pickle liquor is at least settled and/or filtered to remove insoluble materials. However, it is preferred to operate with an excess of ferrous iron through the anode, for instance sufficient to give approximately two-thirds oxidation, since this results in lower cell voltage, reduces the possibility of anode attack, and prolongs anode life.

The treated pickle liquor continuously enters the cell in such a manner that it is the sole electrolyte and the effluent is withdrawn from the cell in such manner that at least a portion of the effluent and preferably all of the effluent passes through the anode. At least as much iron salt must pass through the anode as is necessary to utilize all of the oxidizing characteristic of the anodic current to change the iron from the ferrous to the ferric state and prevent the generation of oxygen or other gas upon or within the anode. Suitable porous carbon for anodes is described in the U. S. patent to Broadwell and Werking, No. 1,988,474, issued January 22, 1935, and in the article entitled "Fabricated Porous Carbon" by L. C. Werking, appearing at vol. 74, page 365 (1938) in the Transactions of The Electrochemical Society. Anodes of porous carbon of grades 30, 40, and 50 as described in the article are preferred as being characterized by pores which are large enough to pass the desired quantity of liquor and to remain unplugged during the normal operation of this process but yet sufficiently small that there is enough surface area at the walls of the pores which contact with the moving electrolyte to prevent such a high current density that anodic gas is formed during the electrolysis. Since the foregoing article was published, porous carbon of grade 60 has appeared on the market, this having pores such that the diameter of the particle retained is 0.00047 inch. Anodes of such carbon may be used in our process.

Before any liquor is introduced into the cell to start it, both electrodes are preferably given conditioning treatments. The preferred cathode is a flexible mild steel sheet which is so treated that, although it will receive a good strike of deposited iron when the cell is properly started, the iron deposit can be separated from the cathode sheet, when the sheet is removed from the cell, merely by flexing the sheet. To prepare the cathode, the sheet is degreased or otherwise cleaned in any suitable manner as by washing or by an electrolytic treatment or the like after which it may be treated with aqueous nitric acid, preferably of about 10% concentration, by dipping, spraying or the like until a surface is obtained characterized by an even matte finish free from surface pits, as more fully described in the application of H. R. Wilson, Serial No. 737,092, filed March 25, 1947. Alternatively the surface may be "blued" by heating thereby obtaining fairly good stripping properties; however, the acid treatment is preferred because of its simplicity. Cathodes of other metals which will receive an iron deposit from the pickle liquor may be used, for instance copper, aluminum, Monel metal, carbon-free iron or stainless or other corrosion-resistant alloy steel, the treatment with nitric acid until the matte finish is obtained showing, in these cases, benefactive results similar to those described for mild steel.

To ensure continuous, trouble-free operation of the cell and to obtain maximum anode performance at lowest permissible potentials, with optimum control of the effluent liquor, we have found it desirable to condition the anodes before using them in cells. This conditioning provides complete wetting of all of the pores and openings in the anode, and assists in the removal of occluded gases, or the gases which might subsequently be produced by reaction of impurities, e. g. sulphides, with the anolyte solution. A further object of the conditioning treatment is to leave the anode acidic to prevent the deposition of basic iron salts when the electrolysis starts. The anode is conditioned by being wet with water, preferably acidified. Any mineral acid may be used. The preferred acids are sulphuric and hydrochloric. Hydrochloric acid operates very well. The acid assists in causing the water to wet the carbon, it decomposes any sulphides or other materials which might otherwise react with the acid in the pickle liquor to form gas bubbles in the anode when the liquor permeates the anode, and it leaves the anode acidic. The strength of the acid preferably corresponds to a concentration higher than 5% but below 15% HCl. In treating the anode, it is preferably immersed in the acidic solution slowly enough for the air, or such gas as may form, to escape from the pores, that is so slowly that no bubbles appear beneath the surface of the water. The anode is then preferably withdrawn from the acid and blown with the air, preferably from the inside, to determine whether or not there are any plugged areas. Plugged areas may usually be opened by the local application of strong air or liquid pressure but if the plugged areas cannot be opened, the anode should not be used. The acidic treatment of the anode gives the highest concentration of acid at the points at which undesirable deposition of hydrolysis products might otherwise occur with subsequent permanent impairment of the electrode.

For satisfactory operation of the process as a whole the cell should be started under special conditions which differ from those obtaining during the general or normal operation of the cell. For optimum results the cell should generally operate at a temperature no higher than 40° C., preferably between about 27° C. and 35° C. with the optimum about 32° C.; but at starting, the cell temperature should be higher than 40° C. and the acidity should be higher corresponding to a pH lower than 1.2. The object is to get a satisfactory adherent, smooth, non-curling strike layer on the cathode. The least curl in the strike deposit will change the inter-electrode spacing, overload the anode opposite this point and by subsequent growth or treeing, create an area of excessive anodic current density which may lead to attack on the anode and liberate oxygen; also the tree may grow into the screen 72 and tear the latter when the cathode is removed. As the electrodes are spaced quite closely to save power and the screen is quite close to the cathode, a comparatively small tree is sufficient to disrupt the cell; and as the trees frequently form (if they form at all) at some distance below the surface of the electrolyte where they are difficult to see, it is important that an adherent, smooth, non-curling strike layer be assured. It is particularly difficult to get a desirable strike layer of iron on an iron cathode, as iron is a difficult metal to plate in any event; but we have found that although the cell should be operated generally at a temperature below 40° C. a good strike of iron can be obtained if the cell is started at a temperature above 40° C. Furthermore, a good strike can be obtained at temperatures up to about 65° C. and, although higher temperatures, e. g. up to boiling, may be used, no added benefit is obtained. In fact, higher tempratures are a disadvantage in that higher acidities are necessary, cathode efficiency is lowered and a longer time is required to reach the optimum lower temperature and lower acidity at which the cell normally operates. A satisfactory starting temperature is about 55° C. and an acidity corresponding to 12–13 grams of acid per liter of electrolyte, this temperature and acidity being preferred as giving a good non-curling strike and not requiring excessive heating of the cell nor undesirably high acid conditions. Both in the general operation of the cell and during the starting period, the acidity must be sufficiently high to prevent the formation of insoluble hydrolyzed iron salts which foul the cathode and screen and plug the anode. It has been found that at temperatures of or below 40° C., these hydrolyzed salts have less tendency to form in the correlated electrolyte than at temperatures above 40° C. Thus the cell may safely be operated generally at an acidity of about 7 grams of $H_2SO_4$ per liter of electrolyte at a temperature of about 25° C., an acidity of about 8 grams of $H_2SO_4$ at about 32° C. and an acidity of about 9 grams of $H_2SO_4$ at 40° C., or a rise in acidity of 2 grams of acid per 15° C. rise in temperature. When the temperature is above 40° C. the acidity is preferably increased at an average rate corresponding to about one-fifth gram of acid per centigrade degree rise in temperature. The rate of increase of acidity per degree of temperature rise should be greater the higher the temperature for temperatures above 40° C. and thus a temperature of 55° C. requires an acidity of about 12–13 grams of acid per liter of electrolyte. The minimum temperature for a good strike is about 45° C. requiring an acidity of 10–11 grams of acid per liter of electrolyte. The cell should not be operated generally under the starting conditions as the required acidity gives an undesirably low cathode efficiency and if the higher acidity is not maintained at the higher temperature the anode plugs. Also the cell should not be started under the general operating conditions as a good strike will not be obtained.

Any suitable procedure may be used for acidifying and heating the cell to start the process. A simple procedure is to preheat the properly acidified liquor, in a vessel separate from the cell, to such a temperature that when introduced into the cell, the cell and liquor are at the proper temperature. With a cell of the type disclosed and holding about 40 liters, liquor heated to about 65° C. and introduced into the cell which is at room temperature of 20–25° C. will bring the cell and electrolyte to about 55° C. As soon as the liquor is introduced, the flows of current and liquor are begun, the liquor which is started flowing being that used for the normal operation of the cell and having an acidity lower than the acidity of the starting electrolyte. Where the cell is operating in a room at normal temperature, the temperature of the cell gradually decreases after the cell is started until the temperature becomes stabilized at such a point (usually slightly above room temperature) that the $I^2R$ heat input to the cell equals the heat loss. If the stabilization temperature is not low enough (as is usually the case) the cell is cooled. But the rate at which the temperature of the cell is permitted to drop during the starting period should be correlated with the flow of electrolyte and with the decreasing acidity of the electrolyte in the cell so as to maintain at all times at least the minimum acidity necessary to prevent the formation of the insoluble hydrolyzed salts at the temperatures between the starting temperature and the final stabilized temperature. With a forty liter cell of the type shown and a starting temperature of 55° C. and a current of 200 amperes and a flow of electrolyte, containing 8 grams of $H_2SO_4$ per liter at room temperature, of about 10 liters per hour, operating in a room at about 25° C., the temperature of the cell (with no external cooling) will be about 50° C. at the end of a half hour and about 45° C. at the end of an hour. However, at the end of the hour the acidity will have dropped from 12–13 grams of $H_2SO_4$ per liter, corresponding to the 55° C. starting temperature, only to about 11–12 grams and thus the acidity is well above the minimum required for 50° C. and 45° C. Usually, in a half hour a smooth well-struck deposit about 0.001 inch thick is formed with a cathode current density of about 27.5 amperes per square foot (200 amperes on the cell). At the end of an hour the deposit will be about 0.002 inch thick. The preferred strike deposit is at least 0.0015 inch in thickness and may be obtained in less than a half hour or in more than an hour, depending upon the cathode current density, and a cell temperature above 40° C. is preferably maintained until such a strike deposit is formed; but when this is obtained, usually within an hour at a cathode current density of about 27.5 amperes per square foot, the cell may be cooled to bring it to its normal operating temperature, preferably about 32° C. It is contemplated that the liquor will flow into the cell at whatever temperature it happens to have, liquor flowing directly from a hot pickling vat through a treating tank and filter and into the cell on a hot summer day being at a considerably higher temperature than liquor used after storage during winter. The size of the cell, the amount of current flowing, the resistance of the cell and the amount and temperature of the inflowing liquor may render cooling, or even heating, necessary or unnecessary and room temperature may range from about 4° C. to 40° C. although it is usually between 18° C. and 32° C. The temperatures of the cell liquor, however, should be as previously indicated.

The starting electrolyte may be heated and acidified and the cell started in other ways; for instance the cell may be filled with cold acidified starting electrolyte and the cell then heated; or the cell may be filled with cold electrolyte, then heated and then acidified but both of these methods have the disadvantage that opportunity is given for the cathode to be etched an indeterminate amount and it is preferred that the cell be filled quickly with preheated correctly acidified starting electrolyte and the current flow begun immediately after the cell is filled. This latter method prevents the acid of the electrolyte from attacking the metallic parts of the cell, particularly the pretreated cathode which may be etched so deeply by standing in contact with the electrolyte, when no current is flowing, that the plate will not easily release from the cathode when it is withdrawn from the cell.

It is contemplated that, when the cell is once started, it will operate continuously, that is for weeks or months without interrupting the flow of current or electrolyte. However, from time to time it is necessary to remove a cathode which carries a plate of iron and to insert a new pretreated cathode. When the cathodes are changed, the electrolyte should be hot and acidified at the time the new cathode is inserted so that a good strike is obtained on the new cathode. A satisfactory procedure for changing cathodes is to remove the old cathode while the cell is in normal operation at low temperature and at low acidity, then to heat the cell and acidify the electrolyte as quickly as possible. The cell may be heated in any suitable manner, for instance by introducing a heating medium into the jacket and running in preheated electrolyte and stirring the electrolyte with hot gas. Acid should be added to the cell in such proportions as to prevent the formation of insoluble materials as the electrolyte is heated. When the electrolyte has reached the temperature necessary to give a good strike on the new cathode, e. g. 55° C. and has been correctly acidified, the heating is discontinued, the new cathode is placed in position and the cell is allowed to cool as previously described in connection with starting the cell. In the preferred procedure, shortly before the cathode is to be changed, cooling is discontinued and the cell solution is warmed until a temperature of 55° C. is reached. During this period, one-half liter of 28% hydrochloric acid per 40 liters of electrolyte in the cell (or an equivalent quantity of sulphuric acid) is added gradually, the rate of acid addition preferably being correlated with the rise in temperature, e. g. 100 cc. for each 5° C., so that the entire amount of acid will have been introduced when the cell temperature has reached 55° C. and the electrolyte will have the acidity correlated with this temperature as previously described for starting the cell. At this point the plated cathode is removed and a new conditioned cathode is inserted into the cell, after which the cell is allowed to cool as previously described in connection with starting the cell. Preferably, the normal rates of flow of the current and electrolyte are maintained during the period of cathode change. This may be a matter of five minutes or slightly more depending upon the skill of the operator in changing the cathodes and the speed with which the cell is heated in the case where the cell is heated after cathode removal. In the preferred method the cathode may be changed in about one minute. During the change of cathodes, iron is allowed to deposit on the conducting container A so that the operation of the anode is not interrupted and uniform correlation of ferrous with ferric iron in the effluent is maintained. The deposit formed on the container during the short period necessary to change the cathodes is of negligible thickness. If a plate of undesirable thickness builds upon the container after a series of cathode changes, the cell is shut down, the cathode is removed and the acidic electrolyte dissolves the plate from the container. The cell is then restarted. With a carefully operated cell a shut-down is required only very infrequently to remove the small amounts of foreign matter which may accumulate during long continued operation and a cathode change about every week is desirable where the cathode current density is 27.5 amperes per square foot. Cathode changes may be more or less frequent, depending in large measure upon how thick a plate can be handled most easily in the plant using the deposited iron but a feature of the process is that, if properly conducted, a thick layer of deposited iron, up to one-half inch or more, can be built up at high current efficiency and with no trees, and can be removed without disrupting the cell or interrupting its operation.

The preferred acid for acidifying the starting electrolyte is sulphuric acid in order that the final product of the process, ammonium sulphate, be not contaminated with another salt. However, if the purity of the final product is not important, other acids may be used.

After the starting period, the cell temperature is dropped to or under 40° C., preferably to a temperature between 25° C. and 35° C. with the optimum at about 32° C. The flow of liquor and current through the cell must be kept below the point of gas generation at the anode. The electrochemical action at the anode is to oxidize ferrous sulphate to ferric sulphate. If the anodic current is so heavy that there is more than sufficient current to oxidize all of the ferrous sulphate passing through the entire anode or through any particular portion of the anode, the current will generate oxygen which may appear as such but which is more likely to attack the carbon of the anode to disintegrate or corrode the anode with the formation of oxidized carbon or $CO_2$. Assuming that the anode is uniform, that is that it has no plugged areas, the current may be increased as desired provided it is held below the point of gas formation at the anode. If gas appears at the anode, the current is decreased or the flow of liquor is increased to supply a larger quantity of ferrous iron to be oxidized. With a properly functioning porous anode, all or substantially all of the iron in the effluent will have been oxidized to ferric iron before any gas appears at the anode. However, we have found that carbon or graphite may be attacked even before the theoretical oxygen discharge potential is reached; in consequence the outer layers of the carbon anode may disintegrate or become soft and spongy, and blocking of pores may occur, even in the absence of visible gas evolution. For these reasons as well as those previously mentioned having to do with the low voltage of the Fe''/Fe''' equilibrium, the factors governing the operation of the cell are correlated so that the effluent always contains at least 5% of its iron as ferrous iron. In accordance with our preferred process, the amount of liquor flowing through the cell is correlated with the current so that the effluent contains only two-thirds of its iron as ferric iron and one-third as ferrous iron. A current density of about 50 amperes per square foot of anode surface and a liquor flow of 42.5 cc. per minute per square foot of anode surface of a liquor containing about 80 grams of ferrous iron per liter of liquor will yield an effluent in which about two-thirds of the iron is ferric iron and one-third ferrous iron with no gas generated at the anode. As every ampere hour of current oxidizes a certain weight of ferrous iron to ferric iron, if the liquor contains less than 80 grams of ferrous iron per liter the flow of liquor should be increased or the current decreased to yield an effluent containing two-thirds of its iron as ferric iron; and vice versa when the liquor contains more than 80 grams of ferrous iron per liter.

Having correlated the flows of current and liquor, the cell is in a condition to operate continuously, liquor treated as previously described flowing continuously into the cell even when the cell liquor is heated and acidified during the period of cathode change. When new cathodes are introduced into the cell, they are preferably conditioned as previously described but once the cell is started, there is no need to change the anode if the cell is properly operated, that is with clear pickle liquor in which the inhibitor has been killed, the solutes have been correlated so that no insolubles are formed when the pickle liquor is brought to the operating temperature of the cell, and the flow of liquor is correlated with the current so that no gas is generated at the anode. Neither the flow of current nor of liquor need be disturbed during the cathode changes.

The effluent from the cell, which is an aqueous solution of a mixture of iron and ammonium salts, with only traces of impurities, may be treated in any desired manner to recover the values. It is contemplated, however, that the effluent will be treated with ammonia to precipitate iron in the form of hydrates or oxides. For this purpose the rate of flow of the liquor through the cell may be regulated and correlated with the flow of current so that substantially all of the iron in the effluent may be ferric iron or substantially all ferrous iron. With a given current, decreasing the flow of liquor increases the proportion of ferric iron in the effluent and increasing the flow of liquor decreases the proportion of ferric iron.

Precipitation of iron hydroxides or hydrates from an iron sulphate solution in which the iron is wholly ferrous sulphate is not complete and yields a gelatinous precipitate extremely difficult to filter. Further, the resultant ammonium sulphate recovered from the filtrate contains residual iron salt and may be discolored. Treatment of a ferric solution also leads to an undesirable end product that cannot easily be separated from the ammonium sulphate containing liquor. However, if, of the dissolved iron, the amount of ferric iron is between the limits of 60% and 70%, an ammoniacal precipitation yields an oxide which is readily filtered with a minimum of occluded impurities, and the residual solution is entirely free from both ferrous and ferric iron and can be concentrated without further purification to give a white crystalline ammonium sulphate.

Satisfactory results are obtained when the effluent solution is about two-thirds oxidized, this permitting precipitation of black, magnetic oxide of iron. In our preferred process, the current and flow of liquor are so correlated that the effluent contains two-thirds of the iron as ferric iron and one-third as ferrous iron which is the correct proportion to precipitate $Fe_3O_4$.

In precipitating the iron, the cell effluent is preferably mixed into aqueous ammonia of so large volume, and with so vigorous stirring, that the cell effluent is dispersed immediately upon its addition to the ammonia bath without building up in the latter any appreciable body of unreacted iron salt. The ammonia water is preferably seeded with hydrated granular black iron oxide, and ammonia is added to the reacting bath in quantities sufficient to neutralize all of the acid in the cell effluent and to supply sufficient base to precipitate all of the iron and to keep the bath ammoniacal at all times. Proceeding in this manner, as is more fully described in the patent application of H. R. Wilson, Serial No. 517,467, filed January 7, 1944, now Patent No. 2,419,240, dated April 22, 1947, a heavy granular precipitate will immediately be formed (instead of a precipitate containing flocculent gelatinous ferric or ferrous hydroxide) which can easily be separated from the mother liquor by settling and decantation or by filtering or in any other suitable manner. The mother liquor is an aqueous solution of substantially pure ammonium sulphate from which the salt may be recovered merely by evaporation of the water. The iron oxide may be utilized as such, e. g. as pigment, or it may be reduced by hydrogen to yield pure iron. The iron deposited in the cell is also very pure and is of a brittle dendritic structure which may easily be powdered. Both the deposited iron and that recovered from the cell effluent may be used in powter metallurgy.

The following is an example of the operation of the process:

Sulphate pickle liquor as received from a pickling plant, containing only a trace of ferric iron, analyzes 83.5 grams of ferrous iron and 7.8 grams of free sulphuric acid, per liter. It also contains residual inhibitor, a proprietary organic amine compound. In the preferred practice of the process a test sample of the liquor is filtered to remove sludge, and sodium nitrite is mixed into the sample until further additions of the nitrite do not cause hydrogen to be released more copiously when the iron strip test is used. The main body of the liquor is treated with a proportionate amount of nitrite, this being 1 gram of the nitrite per gallon of pickle liquor in the present case. The liquor turns brown but, on standing, resumes its original blue-green color. No correction of acidity is made in this case, as the free acid is sufficiently close to the optimum of 8 grams per liter. Ammonium sulphate is then added to bring the ammonium sulphate content to 30 grams per liter. The liquor is then filtered, giving a clear solution with a pH of 1.35–1.45, ready for electrolysis.

The electrolysis is effected in the cell shown on the accompanying drawing. The mild steel sheet metal cathode is treated with 10% nitric acid until brown fumes appear all over its surface, flushed thoroughly with water and inserted into the cell. The anode is of No. 40 grade porous carbon and has a central well. The wall is two inches thick. The anode is soaked with aqueous 10% HCl, tested to show that it is uniformly porous with no plugged areas, and inserted into the cell.

Sufficient of the treated pickle liquor to fill the cell is heated to 65° C. The cold cell is filled with this hot liquor with the addition to the cell of ½ liter of aqueous 28% HCl per 40 liters of liquor in the cell, the cell full of pickle liquor reaching a temperature of 55° C. The flow of liquor is started at the rate of 42.5 cc. per minute per square foot of anode area (outer surface) and simultaneously the flow of current is started at 50 amperes per square foot of anode area. After a half-hour the temperature of the cell has dropped to about 50° C. After an hour's operation, the temperature of the cell has dropped to about 45° C. and a smooth adherent deposit of iron has been obtained on the cathode. Cooling of the cell is also begun so that at the end of the next half hour, the temperature of the electrolyte is about 32° C. The operation of the cell is stabilized at this temperature and the stated flows of current and liquor, yielding an effluent of uniform composition containing 25.1 grams of ferrous iron and 40.9 grams of ferric iron per liter.

After the cathode deposit has built up to the desired thickness, the coated cathode is removed and a new conditioned cathode is inserted into the cell, with acidification and heating, as previously described. Cooling is then begun and operations again stabilized at 32° C.

The plate of iron on the removed cathode shows no treeing, is built up regularly and smoothly and is adherent to the cathode, enabling the cathode and plate to be removed from the cell as a unit; but the deposit readily separates from the cathode when the cathode is flexed. For a 73 hour period of operation, a current of 205 amperes and a cathode efficiency of 82.1%, the deposit weighs 28.5 pounds and represents the plating out of 20.9% of the iron passing through the cell. The brittle plate of dendritic structure is easily ground to a powder. The anode efficiency is 100%. Although the purity of the electroplated iron is dependent to some extent on the purity of the electrolyte, deposits of 99.7% Fe or better are ordinarily obtainable from commercial pickle liquor.

The effluent liquor from the cell is passed into and thoroughly dispersed in aqueous ammonia so that no visible body of the liquor appears where it is introduced. Simultaneously, sufficient ammonia is introduced into the bath to maintain an alkaline reaction. The odor of ammonia above the bath thus indicates that sufficient ammonia is present at all times to react with all of the iron sulphate and free acid in the liquor, in accordance with the following equations:

and

With the bath at about 75° C. (any other temperature may be used although the precipitation operates best at from about 75°–100° C.), a black, granular, filterable hydrated ferrosoferric precipitate is formed immediately upon the dispersal of the liquor in the ammoniacal bath, and no flocculent or jelly-like precipitate of ferrous or ferric hydroxide is seen. After filtration to remove the precipitated hydrated iron oxide, an aqueous solution of substantially pure ammonium sulphate is obtained which shows no test for soluble iron with hydrogen peroxide in ammoniacal solution. The solution is then heated to drive off the water and leave substantially pure ammonium sulphate possibly containing 0.2% chloride in case HCl was used to start the cell. The pure iron oxide may be used for pigment or it may be heated in an atmosphere of hydrogen to yield substantially pure iron. Thus all of the iron may be recovered from the pickle liquor as a high grade product and high grade white crystalline ammonium sulphate free of iron is obtained, both of these products finding a ready market due to their high quality. The only waste is the water evaporated from the ammonium sulphate solution.

For continuous operation the electrolysis is preferably conducted at a temperature no higher than 40° C. and with an electrolyte having an acidity no greater than corresponds to 8 grams of free sulphuric acid per liter. Excessive reduction in temperature, e. g. below 25° C., is undesirable since it lowers conductivity or may carry the electrolyte below the saturation value and so cause salt precipitation in the cell. At temperatures higher than 40° C. increasing quantities of acid are required to prevent hydrolysis, and plating efficiency may be impaired. With acid content below 6 grams of free sulphuric acid per liter of electrolyte, increasing tendency toward hydrolysis may promote anode plugging at 25° C. even where the electrolyte carries as little as 50 grams of iron per liter. Cathode efficiency decreases with increasing acid concentrations and suffers serious impairment with more than 14–16 grams of free sulphuric acid per liter of electrolyte. The acidity and temperature should be correlated, the lesser amount of acid corresponding to the lower temperature. If the pickle liquor as received contains less than 50 grams of iron per liter it is preferably fortified with additional ferrous sulphate or concentrated at least to 50 grams of ferrous iron per liter. Concentration is preferred as the water must later be removed to recover the ammonium sulphate. Waste liquor from hot pickling in some plants may contain so much solute that upon cooling to the operating temperature of the cell, a precipitate may form. If this precipitate contains iron, dilution should be effected to the point where the iron salt remains in solution. The liquor may be further diluted until all of the salts remain in solution or alternatively, and preferably, be cooled and filtered at the point where the iron salts remain in solution, the filtration removing such insolubles as are not dissolved when all of the ferrous sulphate is in solution. With these precautions as much ferrous sulphate may be in the treated liquor as will remain in solution. The upper limit of from about 85 to 100 grams of iron per liter of liquor, represents saturation of the electrolyte at temperatures of 25° C. and 40° C. Reduction in ferrous iron concentration results in lowering of cathode current efficiency, with approximately 50 grams of iron per liter representing the lower limit of effective operation. The ammonium salt has been found to increase the efficiency of the cell and to assist in obtaining a good iron plate. It has been found, however, that ammonium sulphate in an amount above 60 grams per liter of electrolyte has little effect on the plate produced at the cathode and that relatively little effect is produced in going higher than 30 grams per liter. To save carrying too much salt through the process, it is preferred that the upper limit of ammonium sulphate be 30 grams per liter but if it so happens that the neutralization of the acid content of the liquor produces a concentration of ammonium sulphate higher than the 30 grams, the liquor is still usable if treated as described to prevent the formation of precipitate in the cell at its normal operating temperature if such treatment is necessary.

As approximately 85% to 90% of commercial acid pickling is done with sulphuric acid, the treatment of sulphate pickle liquor has been used to illustrate the invention. The utilization of pickle liquors of other acids is, however, within the scope of the invention and the same general procedures would obtain, even though optimum operating conditions might differ in minor respects from those used with sulphate liquors. Thus, with hydrochloric acid solutions, the same general conditions would apply; liquor would require filtration, removal or "killing" of residual inhibitor, correction of acidity and addition of ammonium salt and correlation of starting and operating conditions, including temperature control at lower temperature, e. g. at or below 40° C. for operating, and at higher temperature, e. g. above 40° C. for starting, and the correlation of flow rates of liquor and current to produce an effluent in which two-thirds of the iron salt in the effluent is in the ferric condition. One of the attractive features of the treatment of chloride pickle liquor is the recovery of ammonium chloride, a more valuable product than ammonium sulphate and it is thus evident that if any ammonium salt is added during the process it will be ammonium chloride rather than ammonium sulphate. In the case of chloride pickle liquors, the iron chloride content of the liquor may be considerably higher than in the case of sulphate liquor as ferrous chloride is more soluble than ferrous sulphate. With respect to the iron salts (chloride or sulphate), the amount of chloride used per liter of liquor is in relation to the amount of sulphate used as previously described, as the solubility of the chloride is to the solubility of the sulphate. In both cases the concentration of iron in the feed liquor should preferably not exceed 80% to 90% of the saturation value.

In the case of the chloride liquor, the pH will be corrected by the addition of ammonia or hydrochloric acid as required and any necessary addition of ammonium salt will preferably be in the form of the chloride rather than the sulphate. In the cases of both sulphuric acid and hydrochloric acid and their salts, the amount of free acid in the liquor is that to give the stated pH values at each step in the process. Less hydrochloric acid than sulphuric acid is usually necessary to give the required pH. The objective is to have an acid content high enough to prevent the hydrolysis of iron salts (chloride or sulphate) which might plug the anode and have the other undesirable effects mentioned, yet below the concentration at which iron deposition will be impaired, the acid content being correlated with the temperature at which the cell operates or starts to effect this objective.

As in the case of the sulphate pickle liquors, the amonium salt content of the cell feed solution may depend upon the residual acid content of the raw pickle liquor, e. g. the greater the amount of residual hydrochloric acid, the larger the quantity of ammonia that must be added to bring the pH of the corrected liquor to the desired value and the greater the quantity of ammonium chloride in the adjusted liquor. Also, as in the case of the sulphate liquor if the residual acid content of the raw liquor is too low to give upon neutralization with ammonia, the preferred ammonium chloride content, ammonium chloride as such may be added in sufficient quantity to give a concentration comparable to that established for the sulphate liquor. A preferred concentration of ammonium chloride is up to approximately 25 grams to 50 grams per liter of corrected liquor.

The complete process is very simple to operate on a continuous basis. After an analysis and calculation it is necessary merely to incorporate the desirable amounts of ammonia, ammonium salt and nitrite to prepare the pickle liquor for electrolysis, and to filter the liquor. After starting the cell the prepared liquor is merely run through it in a continuous stream at a rate of flow correlated to the flow of the electric current and to the proportion of ferric and ferrous salt desired in the effluent and the effluent is merely reacted with ammonia water and filtered to recover the iron. From time to time the cell is heated and acidified, a coated cathode section is removed, and a new treated primary cathode is inserted, all without interrupting the operation of the cell or the flow of pickle liquor. The cell may operate indefinitely. The process is highly flexible, however, in that a battery of cells may be used and individual cells cut in or out with very little attention, even during the starting period, and the composition of the effluent may be controlled as desired. The materials which are used in the process in any substantial quantity are very low in cost, the ammonia and hydrogen being by-products and the ammonium salt being a recycled material; and the waste pickle liquor is effectively disposed of with the production of high quality salable products.

The invention is susceptible of modification within the scope of the appended claims.

What is claimed is:

1. Method of treating an acidic iron pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

2. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

3. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing, per liter, and in solution, at least 50 grams of ferrous iron as the sulphate and at least sufficient mineral acid to give a pH corresponding to 6 grams of sulphuric acid, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

4. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature between 25° and 35° C., such a liquor containing at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

5. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature of about 32° C., such a liquor containing at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

6. Method of treating an acidic iron pickle liquor containing a pickling inhibitor which comprises removing the pickling inhibitor from the liquor, passing this liquor into an electrolytic cell having a cathode upon which iron can plate and a porous anode, and electrlyzing in said cell at a temperature up to 40° C., such a liquor having a pH between 1.3 and 1.6, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

7. Method treating a chloride pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor having a pH between 1.3 and 1.6, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas released at the anode.

8. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing, per liter, and in solution, between 75 and 85 grams of ferrous iron as the sulphate and at least sufficient mineral acid to give a pH corresponding to 6 grams of sulphuric acid, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

9. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing between 7 and 9 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

10. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing an ammonium salt of a mineral acid and, at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

11. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing ammonium sulphate and at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

12. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing, per liter, at least 10 grams of ammonium sulphate and at least sufficient mineral acid to give a pH corresponding to 6 grams of sulphuric acid, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains ferrous ions but is enriched in ferric ions, and maintaining the anodic current density below that at which gas is released at the anode.

13. Method of treating a modified acidic iron pickle liquor which comprises passing into an electrolytic cell having a cathode upon which iron can plate and a porous anode and electrolyzing in said cell such a liquor containing substantially no effective pickling inhibitor, withdrawing from the cell an effluent which is the modified pickle liquor after it has passed through the anode and maintaining the anode potential below the oxygen discharge potential, the temperature of the liquor in the cell at the beginning of the plating being maintained above 40° C. and the pH being maintained lower than 1.2 until a strike deposit is formed on the cathode and thereafter the cell being maintained at a temperature between 25° C. and 40° C. and a pH between 1.25 and 2.

14. Method of treating a modified acidic iron pickle liquor which comprises passing into an electrolytic cell having a cathode upon which iron can plate and a porous anode and electrolyzing in said cell such a liquor containing substantially no effective pickling inhibitor, withdrawing from the cell an effluent which is the modified pickle liquor after it has passed through the anode and maintaining the anode potential below the oxygen discharge potential, the temperature of the liquor in the cell at the beginning of the plating being maintained between 40° C. and 65° C. and the pH being maintained between 1.25 and 1.0 until a strike deposit is formed on the cathode and thereafter the cell being maintained at a temperature between 25° C. and 40° C. and a pH between 1.25 and 2.

15. Method of treating a sulphate pickle liquor containing a pickling inhibitor which comprises removing the pickling inhibitor from the liquor, passing this liquor into an electrolytic cell having a cathode upon which iron can plate and a porous anode, and electrolyzing in said cell at a temperature up to 40° C., such a liquor containing at least sufficient mineral acid to give a pH corresponding to 6 grams of sulphuric acid per liter, plating iron from said liquor onto the cathode, passing the liquor through the anode, oxidizing only a portion of the ferrous iron in the liquor at the anode from the ferrous to the ferric state, withdrawing from the cell an effluent which is the pickle liquor after it has passed through the anode and contains about two-thirds of its iron as ferric iron and about one-third of its iron as ferrous iron, and maintaining the anodic current density below that at which gas is released at the anode.

16. Method of treating a modified acidic iron pickle liquor and recovering iron which comprises passing into an electrolytic cell having a cathode upon which iron can plate and a porous anode and electrolyzing in said cell at a temperature up to 40° C. such a liquor containing substantially no effective pickling inhibitor and comprising sufficient mineral acid to give a pH corresponding to from 6 to 9 grams of sulphuric acid per liter, withdrawing from the cell an effluent which is the modified pickle liquor after it has passed through the anode, oxidizing ferrous iron to ferric iron at the anode to the point where between 60 and 70 per cent of the iron in the effluent is in the ferric state, introducing the effluent into an aqueous ammonia bath maintained ammoniacal at least while the effluent is introduced and dispersing the effluent in the bath as soon as it is introduced thereby precipitating a bank granular hydrated iron oxide and forming the ammonium salt of the acid of the pickle liquor, and separating the iron oxide and the aqueous solution of the ammonium salt.

17. A method of treating a modified acidic iron pickle liquor and recovering iron which comprises passing into an electrolytic cell having a cathode upon which iron can plate and a porous anode and electrolyzing in said cell at a temperature up to 40° C. such a liquor containing substantially no effective pickling inhibitor and comprising sufficient mineral acid to give a pH corresponding to from 6 to 9 grams of sulphuric acid per liter, withdrawing from the cell an effluent which is the modified pickle liquor after it has passed through the anode and thereby had its content of ferric iron increased, introducing into an aqueous ammonia bath an iron salt solution comprising the effluent and containing between 60 and 70 per cent of its iron as ferric iron, dispersing the iron salt solution in the bath as soon as introduced and maintaining the bath ammoniacal at least while the iron salt solution is being introduced thereby precipitating a granular iron oxide and forming the ammonium salt of the acid of the pickle liquor, and separating the iron oxide and the aqueous solution of the ammonium salt.

18. Method of recovering iron and ammonium sulphate from a sulphate pickle liquor containing ferrous iron, which comprises: bringing the ferrous sulphate content of the liquor to 80 grams of ferrous iron per liter of liquor; mixing sodium nitrite with the liquor in the proportion of 0.264 gram of the nitrite per liter of liquor; bringing the sulphuric acid content of the liquor to 8 grams of free sulphuric acid per liter of liquor; bringing the ammonium sulphate content of the liquor to 30 grams per liter of liquor; filtering the liquor; providing an electrolytic cell having a slightly etched mild steel sheet metal removable cathode and a cylindrical porous carbon anode having a central well; filling the cell with filtered liquor at a temperature betwen 40° C. and 65° C. and acidified to a sulphuric acid content of between 10 and 14 grams of free sulphuric acid per liter of liquor; simultaneously starting a continuous flow of filtered liquor into the cell between the anode and the cathode, and starting a continuous flow of direct current between the anode and cathode to plate iron on the cathode and oxidize ferrous iron to ferric iron at the anode, and starting a continuous withdrawal of an effluent from the well of the anode, the liquor flowing into the cell being at a temperature between 20° C. and 25° C. and containing 8 grams of free sulphuric acid per liter, the effluent being the liquor after passing through the anode and being withdrawn at a rate equal to the rate at which the liquor flows into the cell; oxidizing ferrous iron to ferric iron at the anode to the point where the iron content of the effluent is one-third ferrous iron and two-thirds ferric iron and maintaining the temperature of the cell liquor between 40° C. and 65° C. and the pH of the cell liquor lower than 1.2 until a strike deposit has formed on the cathode and thereafter maintaining the temperature of the cell liquor between 25° C. and 40° C. and the pH of the liquor between 1.25 and 2; introducing the effluent into an aqueous ammonia bath maintained ammoniacal at least while the effluent is introduced and dispersing the effluent in the bath as soon as it is introduced thereby precipitating a granular iron oxide and forming ammonium sulphate; separating the iron oxide and the aqueous solution of ammonium sulphate; eliminating the water from the solution and recovering ammonium sulphate; and before the plate of cathodic iron becomes sufficiently thick to short circuit the cell, removing the plated cathode from the cell to recover the deposited iron.

GEORGE W. HEISE.
ERWIN A. SCHUMACHER.
HOWARD R. WILSON.

REFERENCES CITED

The following references are of record in the file of this patent:

UNITED STATES PATENTS

| Number | Name | Date |
|---|---|---|
| 788,064 | Ramage | Apr. 25, 1905 |
| 987,318 | Pfanhauser | Mar. 21, 1911 |
| 1,006,836 | Farnham | Oct. 24, 1911 |
| 1,007,388 | Ramage | Oct. 31, 1911 |
| 1,862,745 | Fuller et al. | June 14, 1932 |
| 1,980,381 | Cain | Nov. 13, 1934 |
| 2,273,036 | Heise et al. | Feb. 17, 1942 |
| 2,367,811 | Urbain | Jan. 23, 1945 |
| 2,389,691 | Schumacher et al. | Nov. 29, 1945 |
| 2,418,970 | Donroe | Apr. 15, 1947 |
| 2,419,240 | Wilson | Apr. 22, 1947 |

OTHER REFERENCES

Transactions of American Electrochemical Society, vol. 29 (1916), page 359.